Dec. 25, 1956  E. P. SORENSEN  2,775,032
WORKPIECE-HOLDING PRUNING SHEARS WITH
RESILIENT IN-DRAWING GRIPPER ELEMENT
Filed Oct. 19, 1953  3 Sheets-Sheet 1
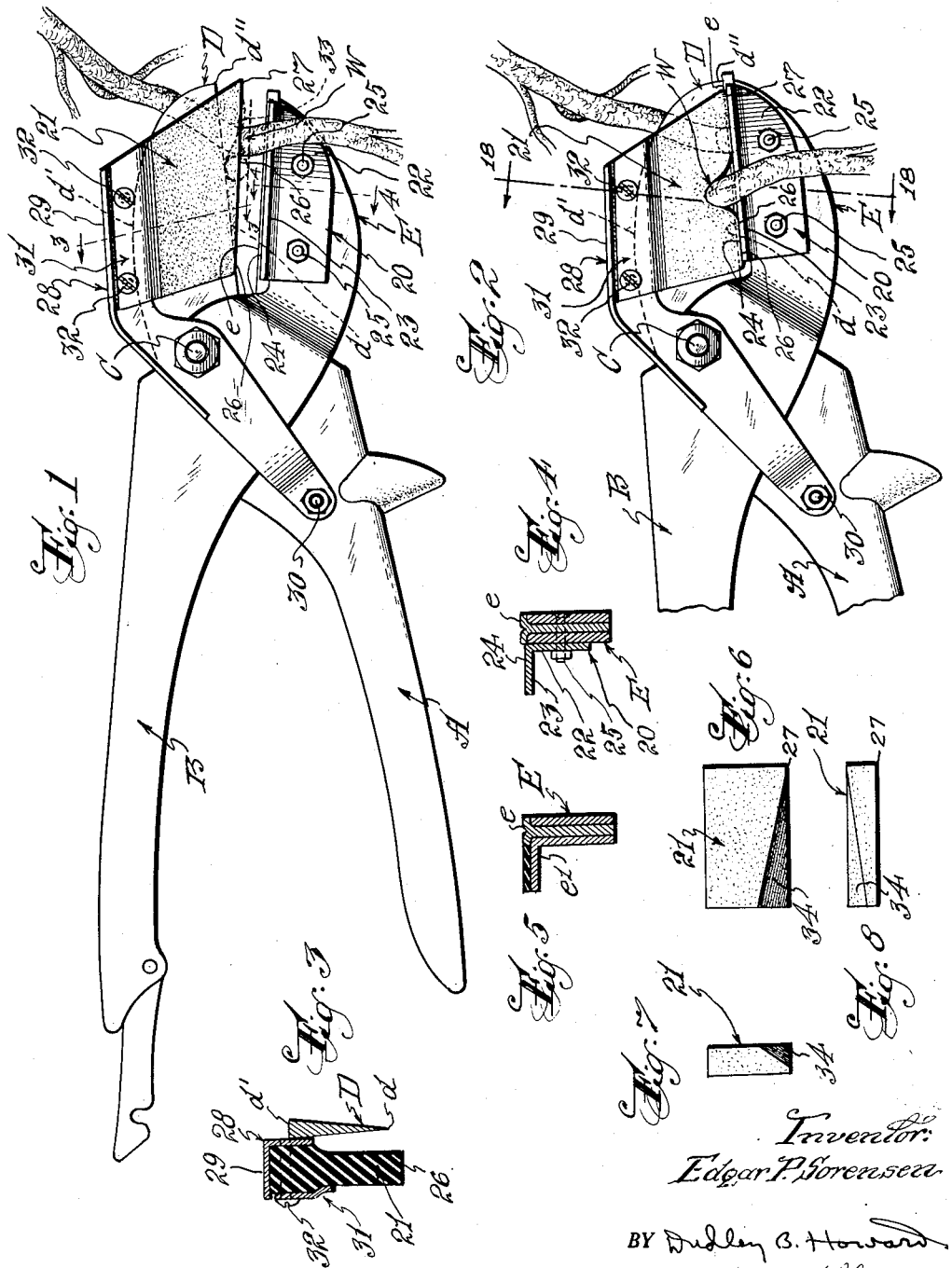
Inventor:
Edgar P. Sorensen
BY Dudley B. Howard
Attorney

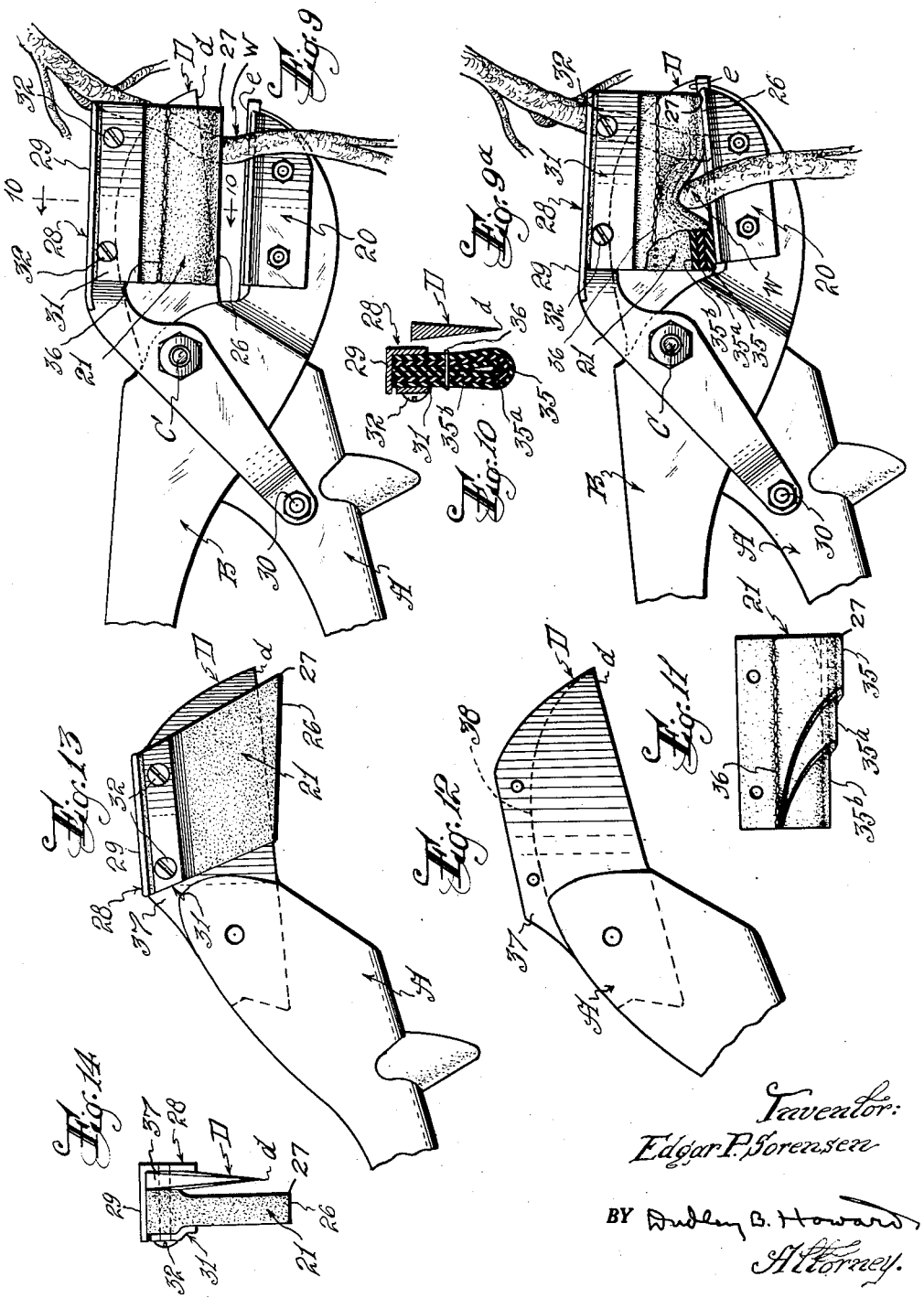

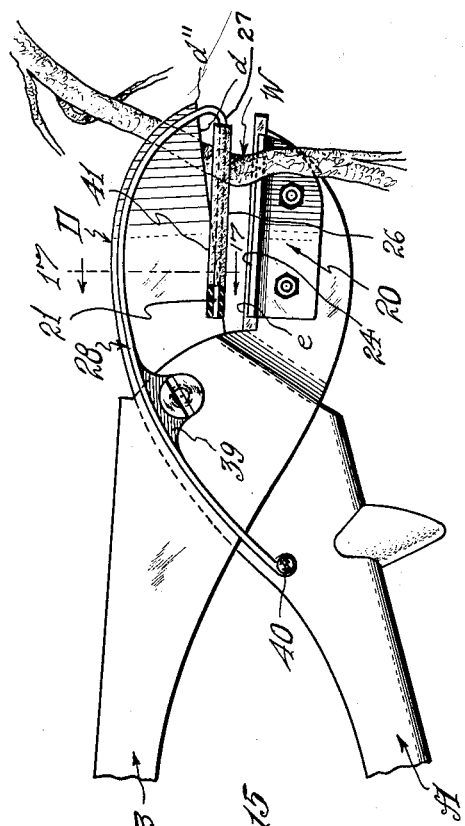
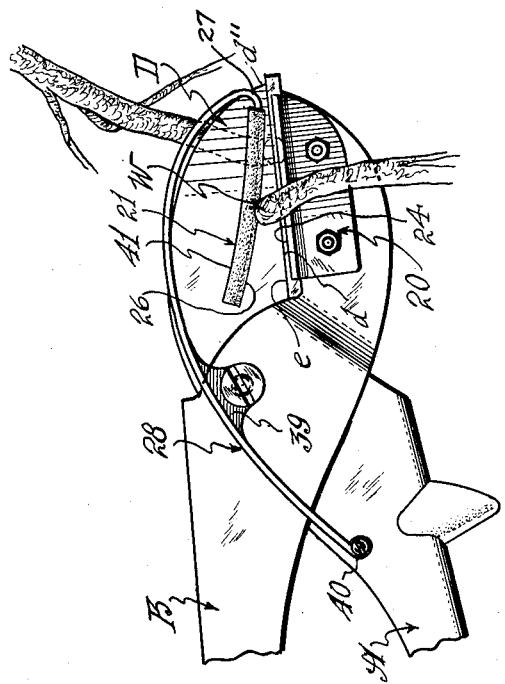
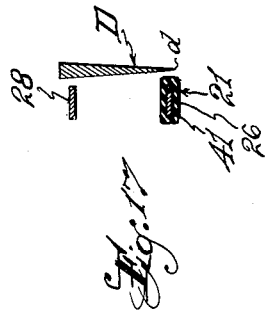
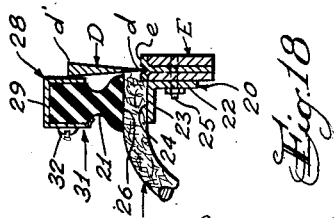

United States Patent Office 2,775,032
Patented Dec. 25, 1956

2,775,032

WORKPIECE-HOLDING PRUNING SHEARS WITH RESILIENT IN-DRAWING GRIPPER ELEMENT

Edgar P. Sorensen, Ontario, Calif.

Application October 19, 1953, Serial No. 386,723

4 Claims. (Cl. 30—134)

The invention relates to pruning shears and has particular reference to the type of shears which are provided with means to seize and maintain a firm supporting grip on the severed part of a tree branch, bush, vine or plant being pruned so that the said part, or "workpiece" as it will be termed hereinafter for the sake of brevity, may be carefully deposited in a receptacle or neat pile without being touched by either hand.

Pruning shears of this kind are peculiarly suitable for use in cutting off bunches of grapes or the blooms of flowering plants which are very fragile and otherwise would be dropped and injured whenever the picker's implement-free hand is engaged in steadying the vine or plant that bears the part being severed and thus cannot be used to grasp the latter.

Numerous types of workpiece-holding pruning shears are available on the market, but are deficient in certain respects. For instance, the workpiece-contacting faces of the gripping elements associated with the cutting jaws of the shears generally are arranged parallel to the workpiece-engaging edges or faces of said jaws. This arrangement is unfortunate because, as is well known, the cutting jaws present an outwardly diverging V-shaped arrangement of their workpiece-contacting edges or faces throughout closing movement of the jaws. Consequently, unless the branch, vine, or the like, being pruned, be held firmly in the mouth of the cutting jaws by the implement-free hand, there will be a strong tendency of said jaws to expel the branch, etc., through pinching or squeezing action, particularly when the latter is hard, round and slippery. With the workpiece-contacting faces of the gripping elements arranged parallel to the corresponding faces or edges of the cutting jaws, the intended function of the gripping elements is counteracted by the workpiece-expelling action of the cutting jaws in a one-hand pruning attempt.

With the foregoing disadvantages of the prior art workpiece-holding pruning shears in mind, it is my primary object to provide an improved workpiece-holding device for attachment to existing pruning shears or for incorporation in the implement structure at the time of manufacture, which device includes a fixed gripper element on one implement jaw and a resiliently compressible gripper element on the other jaw that coacts with said fixed gripper element in such a manner that pressure of a workpiece against the resiliently compressible element as it is being severed will compress the latter element to create a temporary restraining wall on the outer side of the workpiece, i. e., in the direction of the mouth of the space between jaws. The effect of this change in surface configuration will be to wall-in the workpiece against endwise expulsion from between the implement jaws due to their normal squeezing action as they close on the workpiece with their relatively inclined cutting edges. Moreover, the workpiece will continue to be walled-in so long as the implement jaws are held closed during the act of disposing of said workpiece.

Another object of the invention is to use rubber, or any suitable substance possessing the same elastic properties as rubber, either wholly or in part in the construction of the resiliently compressible gripper element in order to take advantage of the high degree of friction which will be developed between the contacting surfaces of said gripper element and the workpiece in added opposition to accidental ejection of the latter from between the implement jaws.

A further object is to provide a resiliently compressible gripper element of such composition and construction that it will exert an in-drawing force, or pull, on the workpiece in addition to barring egress only passively.

Other objects, advantages and features of the invention will become apparent as the following specific description is read in connection with the accompanying drawings, in which:

Fig. 1 is a side elevational view of a pair of pruning shears of well-known make which has been modernized to include the improved workpiece-holding adjunct, showing the jaws of the implement closing on a conventionally represented workpiece at the stage immediately preceding cutting action; Fig. 2 is a similar view, partially broken away, showing the final stage after the workpiece has been completely severed; Fig. 3 is a cross-section on line 3—3 of Fig. 1; Fig. 4 is a similar view on line 4—4 of Fig. 1; and Fig. 5 is a front elevation of a modified anvil jaw having the fixed gripper element formed integral therewith.

Fig. 6 is a detail side elevation of a modified form of the resiliently compressible gripper element; Fig. 7 is a rear elevation of the same; and Fig. 8 is a bottom plan view thereof.

Fig. 9 is a fragmentary side elevation of the cutting jaw of a pair of pruning shears having a still further modified form of resiliently compressible gripper element applied thereto; Fig. 9a is a view similar to Fig. 2 showing the modified resilient gripper element in the final gripping stage; and Fig. 10 is a cross-section on line 10—10 of Fig. 9.

Fig. 11 is a side elevation of a modification of the resiliently compressible gripper element shown in Figs. 9 and 10.

Fig. 12 is a detail fragmentary side elevation of the cutting jaw of the type of pruning shears adopted for purposes of illustration which has been modified to improve the mode of attachment of the resiliently compressible gripper element; Fig. 13 is a similar view showing a correspondingly simplified resiliently compressible gripper element in assembled condition on the modified jaw; and Fig. 14 is a front elevation of the assembly shown in Fig. 13.

Fig. 15 is a fragmentary side elevation of a pair of pruning shears having a still further modified form of resiliently compressible gripper element in assembled condition, showing the jaws of the implement closing on a conventionally represented workpiece at a stage immediately preceding cutting action; Fig. 16 is a similar view showing the final stage after the workpiece has been completely severed; and Fig. 17 is a cross-section on line 17—17 of Fig. 15.

Fig. 18 is a sectional view taken on the line 18—18 of Fig. 2.

Referring now in detail to the drawings, in which like reference characters designate corresponding parts in the several views, the improved workpiece-holding invention has been disclosed in a few presently contemplated embodiments wherein it is structurally adapted to fit a pair of pruning shears of well-known make chosen for the purpose of illustration only. Obviously, it is well within the scope of the invention to adapt the same to other pruning shears designs.

The implement disclosed in the drawings has relatively movable handles A and B that are connected together by transverse pivot pin C. At this juncture, it may be explained that the term "handle" is used in the trade to embrace both the rearwardly extending manipulating portion and the short shank portion immediately in advance of the pivot to which a workpiece-engaging jaw is added either as an integral part or by attachment, as by rivets or bolts. In the illustrative example, handle A has a cutting jaw D removably secured to its shank portion. The said jaw D is in the form of a V-type blade having a straight inner cutting edge $d$ and a smoothly curved longitudinally convex outer margin $d'$ which is blunt throughout the greater part of its length and merges with cutting edge $d$ at the forward end of the jaw in a conveniently sharp nose $d''$. Whereas some types of pruning shears have cutting blades on both jaws that overlap as they close, the implement chosen for the purpose of illustration is of that type which employs an anvil of comparatively soft metal on one jaw for engagement by a cutting blade on the other jaw. Therefore, in this example handle B is represented as having an anvil jaw E that conforms in profile to cutting jaw D. The straight and laterally flat inner anvil face $e$ of jaw E is arranged to bear flatly and evenly against the opposed edge $d$ of cutting jaw D when both jaws are completely closed.

In accordance with the present invention, a rigid gripper element 20 is affixed to one jaw of the pruning shears implement and a resiliently compressible gripper element 21 is mounted on the other jaw in opposed coacting relation to rigid gripper element 20. If the shears were of the type in which both jaws have cutting blades, it would not matter which element is borne by which jaw. However, in the illustrative example, wherein one jaw is a cutting blade and the other has an anvil face for coaction with said cutting blade, it is preferred to affix the rigid gripper element 20 to anvil jaw E and to mount the resiliently compressible gripper element 21 on cutting jaw D either directly or in such a manner that it moves with said jaw D in close side-by-side proximity.

For the sake of brevity, the resiliently compressible gripper element will from now on be termed the "resilient gripper element."

Rigid gripper element 20 will be described in detail first. As shown particularly in Fig. 4, said element 20 is preferably cut from a metal bar of L-shaped cross-section to provide an attaching flange 22 and a perpendicular flange 23 which presents an inner workpiece-contact face 24 in coacting opposition to the corresponding face of the resilient gripper element, which will be described in detail presenting. The forward edge of attaching flange 22 is rounded in conformity to the shape of anvil jaw E. Rigid gripper element 20 is assembled with anvil jaw E in a position wherein workpiece-contact face 24 is slightly offset outwardly from anvil face $e$ in order that the rigid gripper element will not be subjected unnecessarily to the strong cutting force exerted by cutting jaw D on anvil jaw E. Rigid gripper element 20 should be applied to the side jaw E that is best suited to the handedness characteristics of prospective buyers. For example, if a particular implement is to be adapted for use by right-handed persons, both gripper elements should be applied to the right side, because it is customary to employ the left hand to steady the branch, vine, etc., so that the workpiece will project from the right side of the implement jaws. When the improved workpiece-holding invention is built into pruning shears at the time of manufacture, it will be the practice, of course, to produce both right-hand and left-hand implements in respective numbers proportional to the percentages of persons who may require the use of pruning shears that are likely to be right-handed and left-handed. The implement depicted in the accompanying drawings is intended to be held in the hand with the anvil jaw located underneath the cutting jaw. In this position, some of the weight of workpiece W will be sustained by anvil face $e$ of jaw E so it is preferred to affix rigid gripper element 20 to this particular jaw in order that resilient gripper element 21 will not be subjected to excessive weight.

Any suitable means may be employed to attach flange 22 of rigid gripper element 20 to anvil jaw E, but a simple expedient in modification of an existing implement is to drill registering holes through said flange and jaw for penetration by attaching bolts 25, or equivalent attaching means. In accordance with the contemplated merchandising practice, packaged sets of mated gripper elements and the attaching and mounting means therefor will be supplied for use by consumers who may desire to modernize pruning shears already in possession. The attaching flange of the rigid gripper element of such a set will therefore be pre-drilled and thus may be used as a template in drilling registering holes in the anvil jaw of the implement to which said gripper element is to be affixed. The same practice applies to the resilient gripper element and its mounting means, which will become more clearly understood as the description progresses.

Fig. 5 illustrates the alternative manner in which the anvil jaw of a pair of pruning shears may be provided with a rigid gripper element coincident with manufacture of the implement. In this instance, rigid gripper element 20 may be formed by an integral lateral flange $e'$ on anvil jaw E. In this same figure, flange $e'$ is shown as being faced with rubber, which may be desirable when the implement is to be used almost exclusively for cutting small-diameter workpieces, such as the stems of grape bunches and flowers. However, it is preferred to have a hard, smooth workpiece-contact face 24 when the implement is to be used mostly in cutting large-diameter, round, hard workpieces in order that minimum resistance will be offered to the in-drawing effect of resilient gripper element 21, particularly the highly effective embodiments disclosed in Figs. 6, 7, 8, 11, 15 and 16, as will be explained more fully later herein.

For home modification of pruning shears, it is preferred to provide a cantilever mount for the resilient gripper element 21 instead of applying it directly to cutting jaw D. The structure of any selected mounting means will depend upon the form of the resilient gripper means, so the latter will be described in detail first. The resilient gripper element 21 shown in Figs. 1, 2 and 3 is in the form of a narrow block of rubber, or equivalent material, of suitable softness. In profile, the rubber block is a general quadrilateral, but the principal reason for this configuration is to approximate the area and general shape of cutting jaw D without resorting to any curved marginal faces. The really important thing to be accomplished is to give resilient gripper element 21 a form and location in relation to cutting jaw D that will insure registration of the inner, or bottom, work-piece-contact face 26 of said element with the corresponding face 24 of rigid gripper element 20 when the implement jaws are closed, and which will cause said face 26 of resilient gripper element 21 to be angularly arranged with respect to cutting edge $d$ of jaw D when both jaws are open in a manner which makes the nose portion 27 of said element 21 project inward from nose $d''$ of jaw D. By this arrangement of the nose portion 27 of resilient gripper element 21, an inclined restraining wall of restricted vertical extent is permanently provided on said element at the mouth of the space between jaws D and E to function in a manner to be described presently. For registration of workpiece-contact faces 24 and 26 of the respective gripper elements 20 and 21, it is, of course, necessary to mount resilient gripper element 21 at the right side of cutting jaw D. The previously mentioned cantilever mounting means for this purpose comprises an elongated, bent mounting member 28 which preferably is stamped from sheet metal. A perpendicular stiffening flange 29 is formed along the upper edge of mounting member 28 from the front end thereof rearward to a point in rear of its center. Flange 29 projects toward the right and the portion thereof in advance of the bend in mounting member 28 overlies resilient gripper element 21 in contact with the upper thick edge of said element and thus serves as backing means therefor in addition to its stiffening function for mounting member 28 as a whole. At substantially its midpoint mounting member 28 is drilled for engagement by pivot pin C of handles A and B, whereby member 28 is held in bearing contact with the right side face of handle B. At a sufficient distance in rear of pivot pin C to avoid interference with pivotal movement of handle B, mounting member 28 is offset inwardly to bring its rear arm into flat contact with handle A. Here, the extremity of said rear arm is anchored to handle A in any convenient manner, as by screw 30 or equivalent means. Resilient gripper element 21 is secured in position against the right side face of the front, downwardly bent arm of mounting member 28 and in abutting contact with backing flange 29 by suitable means, such as the clamping cleat 31 and screws 32 which are preferred for convenience in replacing the rubber gripper element when worn or damaged.

The operation of the modernized pruning shears disclosed in Figs. 1 to 4, inclusive, will now be described. Referring first to Fig. 1, it will be observed that, when the implement jaws D—E are closed on workpiece W until the latter is contacted by the respective faces 24 and 26 of rigid gripper element 20 and resilient gripper element 21, as shown in solid lines, the said faces will be substantially parallel due to the normal inclination of face 26 in relation to cutting edge d of jaw D. Therefore, during continued closing of the implement jaws into the relation represented in broken lines, the gripper elements 20—21 will exert no expelling force on workpiece W. On the contrary, during this jaw movement, workpiece W will indent resiliently compressible gripper element 21. The result of this indentation will be such deformation of said element 21 that its nose portion 27 will bulge inwardly toward the nose of rigid gripper element 20 to form a restraining wall 33 at the forward side of workpiece W, which also will have the effect of squeezing said workpiece inward or rearward, that is, toward the pivot pin C in sliding contact with anvil face e of jaw E. In a general sense, this will be an in-drawing effect. Thereafter, in use of the resilient gripper element embodiment disclosed in Figs. 1 to 4, the principal effect of closing jaws D and E further will be to embed workpiece W more and more deeply in the rubber mass of said element until the condition of maximum confinement shown in Fig. 2 is attained. It should be apparent that the inclined opposed faces of implement jaws D—E will be defeated in their normal tendency to expel the workpiece, wherefore it is entirely practicable with my improved workpiece-holding device to render the pruning shears implement capable of use in a one-handed pruning operation. That is, the implement will be manipulated by one hand while the other will be free to hold a basket or other receptacle into which the severed workpieces may be deposited without being touched by either hand.

In Figs. 6 to 8, there is disclosed a modified form of resilient gripper element, which is intended to increase both the walling-in of the workpiece and the in-drawing effect on the same. In this instance, rubber or the like is used in the composition of resilient gripper element 21 the same as in the embodiment shown in Figs. 1 to 4. The rubber block is rectangular in profile but its lower edge portion has a shape that renders it comparatively stiff at the front nose-forming area and increasingly more soft and yieldable from there to the rear end of the block. While this rearward weakening or softening of the block may be achieved in other ways not shown, a simple and effective way is to cut away the lower edge at one side obliquely as at 34 to taper the bottom workpiece-contact face 26 from front to rear. Face 26 need not be tapered to a point, so the width of said face will at no place be so narrow as to objectionably weaken resilient gripper element 21. In fact only slight rearward gradation in relative yieldability is necessary to accomplishment of the desired purpose, which is to wall-in an engaged workpiece and to exert the additional in-drawing force on it. It should be readily understood without further illustration that, as a workpiece is engaged by the outer portion of contact face 26 inwardly of the comparatively stiff nose-forming area, the weaker areas of face 26 will tend to yield and permit the workpiece to drift with gradually increasing speed rearwardly into the mouth of the implement jaws due to the progressive rearward declination of resistance to compression.

Figs. 9 and 10 disclose another modified form of rubber gripper element 21 that is adapted to fit the mounting member 28 represented in Figs. 1 to 4. Instead of using a solid block of rubber, element 21 is produced by folding a suitable number (three in this instance) of sheets of rubber, such as may be cut from discarded automobile inner tubing, of twice the normal width of said element into the required compact laminated form composed of outer, intermediate and inner plies 35, 35a and 35b, respectively. After the said plies, or laminae, are stitched together along a medial line, as at 36, the cut longitudinal edge portion of element 21 is drilled to match the screw holes in mounting member 28 and said element is clamped therein in the usual manner previously described.

Fig. 11 shows a resilient gripper element 21 of the same general structure as represented in Figs. 9 to 10. In this instance however, the workpiece in-drawing properties of the form of resilient gripper element shown in Figs. 6 to 8 are achieved by cutting off rearward parts of the respective outer and intermediate plies 35 and 35a in the staggered unmasking arrangement shown. In other words, the arrangement is such that workpiece-contact face 26 of the forwardly located outermost ply 35 is shorter than the corresponding faces of the intermediate and innermost plies 35a and 35b, respectively. As a result of this formation, resilient gripper element 21 will be progressively thinner and thus more yieldable along its under face from front nose 27 rearward in order to exert the desired in-drawing pull on a workpiece engaged therewith in use of the implement on which said element is mounted.

Figs. 12, 13 and 14 show the manner in which the cutting jaw of a pair of pruning shears may be modified easily and economically during manufacture of cutting jaw D, which happens to be a separate part held in rigid assesmbled relation to handle A by the pivot pin, to permit direct attachment of resilient gripper element 21 to said jaw. To this end, a mounting rib 37 is formed on the outer margin of jaw D outside broken line 38, which outlines the original outer margin of the conventional jaw. Rib 37 is drilled to accommodate the attaching screws 32—32 of mounting member 28, which in this instance is of substantially the same length as resilient gripper element 21.

Figs. 15 to 17, inclusive, disclose a still further form of the resilient gripper element in which resilient changes in surface configuration is achieved almost exclusively by a metallic spring structure. A flat arcuately bent spring mounting member 28 is shaped preferably to conform substantially to the curvature of the outer marginal edge of handle A and cutting jaw D and has a depending medial perforated ear 39 for penetration by pivot pin C. The rear end of member 28 is anchored to handle A in rear of the pivot by screw 40. At the front end of mounting member 28 in close proximity to nose d'' of jaw D, an extension of said member 28 is bent reversely inward to provide a straight resiliently compressible gripper element 21 in the form illustrated wherein its nose 27 projects beneath cutting edge d of jaw D and the free rear end portion thereof is inclined upward and rearward in converging relation to said cutting edge d to merge therewith at a point remote from nose d''. The resilient gripper-element-forming extension of mounting member 28 preferably is inserted into a transversely stretched piece of small-diameter rubber tubing 41 in order to soften the workpiece-contact face 26 and also increase the friction of engagement with workpiece W. Fig. 16 depicts the manner in which resilient gripper element 21 flexes when pressed into engagement with workpiece W. The free end portion of resilient gripper element 21 is more flexible than the nose portion 27, so the desired walling-in and in-drawing effects will be applied to the workpiece.

The rubber, or rubber substitute, used in production of the resilient gripper element and in facing the rigid gripper element, when this is done, should be carefully selected for degree of softness or flexibility. It should be sufficiently flexible to compress above and around a twig, vine, or other workpiece being cut without greatly increasing the pressure required to operate the implement handles but should be firm enough to insure a secure grip on the severed workpiece. In other words, the rubber gripper element should be self-fitting and firm in its grasp regardless of the shape or size of the workpiece.

While it has been stated hereinbefore that the contemplated practice in modernization of existing models of pruning shears is to make available on the market sets of gripper elements and mounting means so that individual owners may do the work in their home workshops, it may be found to be more satisfactory for the manufacturer of the workpiece-holding accessory parts to do the job upon submission of the old models by their owners.

It will be understood that it is intended to cover all changes and modifications of the examples of the invention herein chosen for the purpose of illustration which do not constitute departures from the spirit and scope of the invention.

Having thus described the invention, I claim:

1. Workpiece-holding and indrawing pruning shears comprising: a pair of articulated handles united by pivotal means; coacting workpiece-severing jaws operatively supported by said handles; and workpiece-gripping means also supported in cooperative relation to the respective jaws and including a rigid gripper element immovable with respect to one of said jaws and a resilient gripper element movable with the other jaw in yielding relation thereto and positioned directly opposite to said rigid gripper element for contact therewith when the jaws are closed, said gripper elements having normally substantially straight opposed workpiece-contact faces of which the said face of the resilient gripper element is angularly arranged on the corresponding jaw with its forward portion more remote from the handle pivotal means projecting inward from said jaw into the mouth of the space between jaws when open to form a workpiece restraining nose and the rearward portion of said workpiece-contact face converging upon the rearward portion of said jaw, the composition and construction of the resilient gripper element being such that its nose is comparatively stiff and the portion rearward of said nose is increasingly more compressibly yielding with distance from the nose, whereby a workpiece initially restrained by the nose of the resilient gripper element in cooperation with the rigid gripper element will be drawn rearwardly inward along the said rigid element during closing action of the workpiece-severing jaws due to progressive rearward declination of resistance to compressive forces by said resilient gripper element.

2. Workpiece-holding and indrawing pruning shears as defined in claim 1, wherein the resilient gripper element is in the form of a block of rubberlike material that has its inner workpiece-contact face inclined rearward in converging relation to the corresponding workpiece-severing jaw rearwardly from the mouth of the space between jaws.

3. Workpiece-holding pruning shears as defined in claim 1, wherein the resilient gripper element is in the form of a metallic spring having a base portion anchored to one of the handles and arranged to extent forwardly along the corresponding jaw to a point adjacent to the mouth of the space between jaws is bent rearwardly into a nose projecting inwardly beyond the inner workpiece-engaging face of said jaw and has a substantially straight free end portion extending rearwardly in normal rearwardly converging angular relation to said jaw, whereby the free end portion of the spring is progressively more yieldable as it recedes from the jaws mouth.

4. Workpiece-holding pruning shears as defined in claim 1, wherein the resilient gripper element is a narrow block of soft rubberlike material mounted with one edge inwardly presented to form a workpiece-contact face, said block being laminated in formation and composed of innermost, intermediate and outermost plies, said outermost and intermediate plies having rearward portions thereof cut away in staggered relation whereby the forward portion of the block is comparatively thick and unyielding and the rear portion is progressively more yielding to exert an in-drawing effect on a workpiece engaged by said block.

References Cited in the file of this patent

UNITED STATES PATENTS

| | | |
|---|---|---|
| 129,946 | Grover | July 30, 1872 |
| 257,389 | Sager | May 2, 1882 |
| 406,524 | Jennings | July 9, 1889 |
| 594,072 | Forde | Nov. 23, 1897 |
| 1,901,739 | Engel | Mar. 14, 1933 |
| 2,302,810 | Steegmuller | Nov. 24, 1942 |

FOREIGN PATENTS

| | | |
|---|---|---|
| 148,648 | France | Apr. 28, 1882 |
| 10,064 | Great Britain | May 21, 1895 |
| 19,131 | Great Britain | Sept. 5, 1904 |